June 3, 1941.  E. G. ERICKSON  2,244,145
FOOD COOKER
Filed July 26, 1940  2 Sheets-Sheet 1

INVENTOR.
E. G. ERICKSON
BY Merrill M. Blackburn
ATTORNEY

INVENTOR.
E. G. ERICKSON
BY Merrill M. Blackburn
ATTORNEY

Patented June 3, 1941

2,244,145

UNITED STATES PATENT OFFICE 2,244,145

FOOD COOKER

Erick G. Erickson, Moline, Ill., assignor to Wafl-Berger, Inc., Moline, Ill., a corporation of Illinois Application July 26, 1940, Serial No. 347,694

6 Claims. (Cl. 53—7)

The present invention relates to specific improvements in apparatus for performing the function claimed in the Fred B. Fink Patent No. 2,191,275, issued February 20, 1940, and more particularly to improvements upon the structure shown in Fig. 7 of that patent.

Among the objects of this invention are to provide improved means for separating the pressure plates in a cooker of the character indicated; to provide improved means for raising and lowering the pressure plates in a cooker of the character indicated; to provide yielding pressure means whereby pressure may be maintained on food between the pressure plates and yet the cover will close, even though the thickness of the food may be somewhat greater in spots than it is intended that it should be; and such further objects, advantages, and capabilities as will hereafter appear and as are inherent in the structure disclosed herein. My invention further resides in the combination, construction, and arrangement of parts illustrated in the accompanying drawings, and, while I have shown therein what is now regarded as the preferred embodiment of this invention, I desire the same to be understood as illustrative only and not to be interpreted in a limiting sense.

In the drawings annexed hereto and forming a part hereof,

Reference will now be made in greater detail to the annexed drawings for a more complete description of this invention. In the structure shown in the accompanying drawings, a container 1 contains and supports a cooking pot 2, which may be made integral with the casing, and has a cover 3 pivotally connected thereto at 4. This cover ordinarily fits closely down on top of the container and pot, except when food is being put into or removed from the cooker. This conserves heat and reduces the escape of fumes from the heated cooking fluid, contained in the cooking pot. Neither this fluid nor the controlling thermostat nor the leads for the heating unit 5 are shown in these drawings, as these are conventional.

Figure 4:
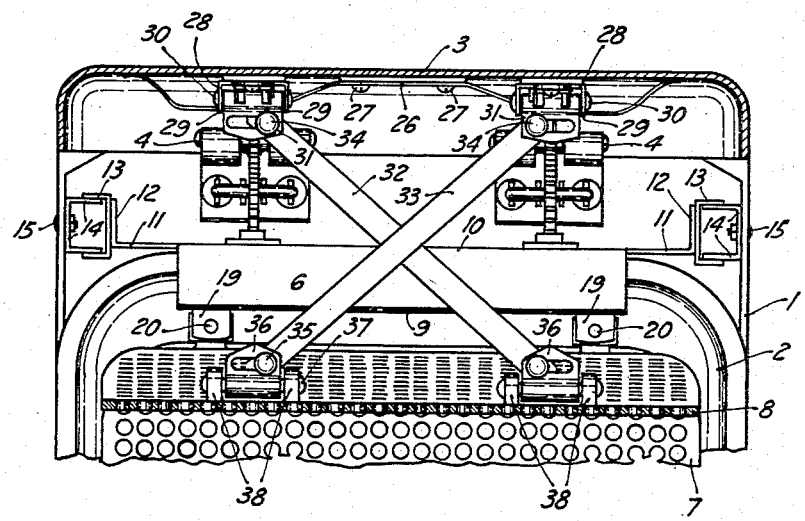
Fig. 4 represents, fragmentarily, in plan section, the structure shown in Fig. 1, substantially as indicated by the line 4—4 of that figure.

A support 6 for the pressure plates 7 and 8 is illustrated as comprising the two elements 9 and 10 which are secured together at their upper ends to form a U-shaped member which straddles the edge of the pot 2 and may move up and down with relation thereto. At the right and left sides of the member 10 are arms 11 which extend laterally (see Fig. 4) and are best at right angles to form the arms 12. These are secured to channel members 13, which, as shown in Fig. 4, straddle and fit closely the channel members 14 which are secured to the sides of the container 1. These channel members 14 may be secured in place by means of bolts 15 or otherwise. It is evident that upward and downward sliding of the channel members 13 with relation to the channels 14 will serve to guide the U-shaped member 6 in its up and down movements.

The lower plate 7 has a pair of lugs 16 which extend in a generally upward direction for connection to the member 9, and each of these lugs has a downward projection 17 which serves as a stop to limit the downward motion of the plate 7. The structure described up to this point is quite like that described and claimed in an application of Herchael Wood Miller, filed concurrently herewith, in which application this subject matter is claimed.

Figure 2:
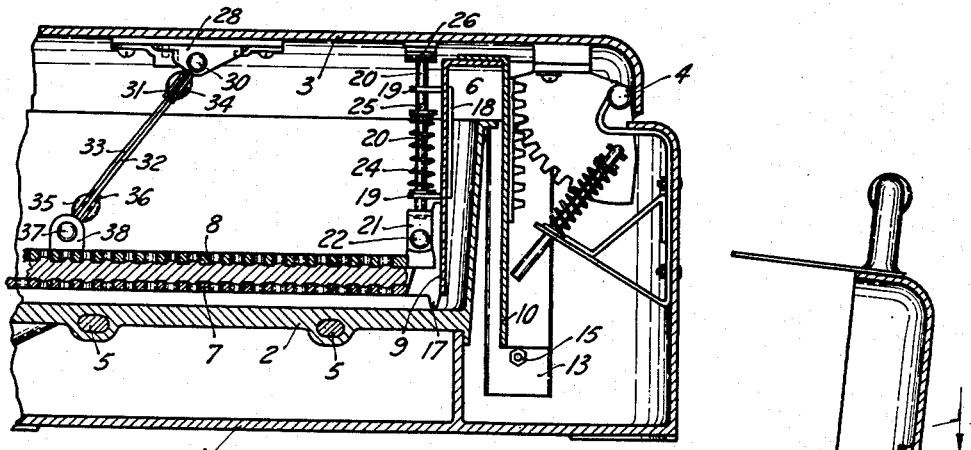
Fig. 2 represents, fragmentarily, the structure shown in Fig. 1, with the cover closed.
Figure 1:
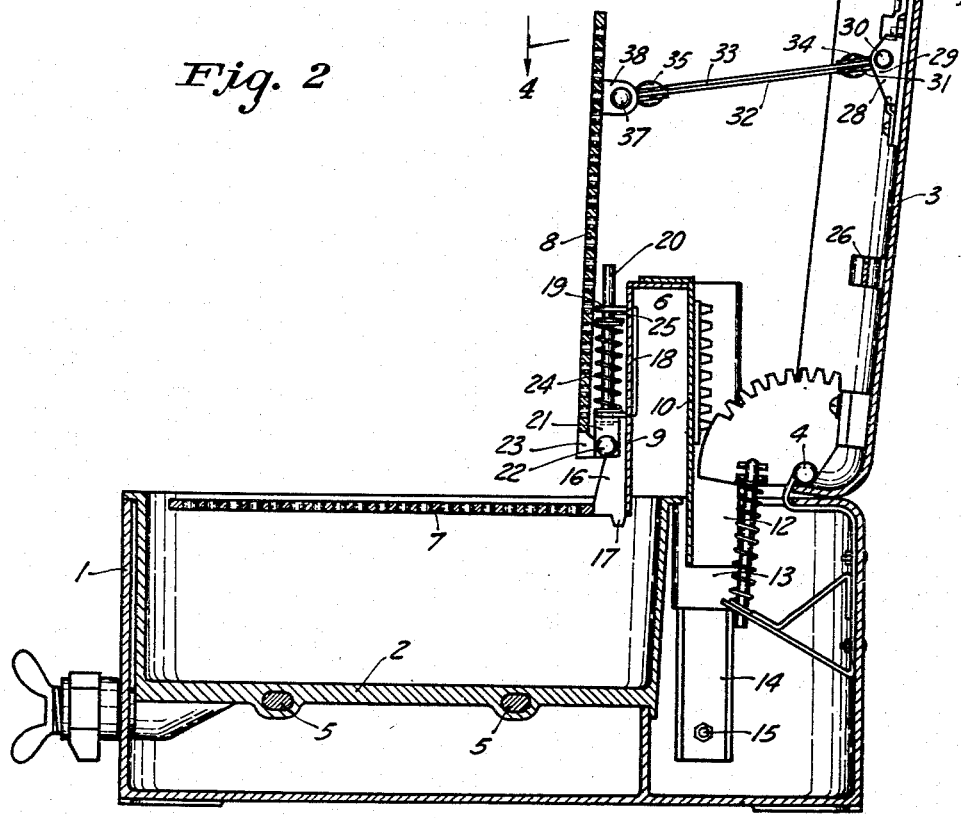
Fig. 1 represents a vertical transverse section of a structure embodying my present invention.

Yokes 18 have upper and lower horizontal arms 19 which extend through openings in member 9. The arms 19 have holes therethrough for the reception of the spindles 20, connected at their lower ends to yokes 21 pivotally connected at 22 to the ears 23 projecting from the plate 8. This furnishes a pivotal mounting for the plate 8 so that it may be lowered from the position shown in Fig. 1 to that shown in Fig. 2.

A spring 24 surrounds each spindle 20 and rests at its lower end against the upper surface of the lower arm 19, its upper end pressing against the washer surrounding the spindle and limited in its upward motion by a pin 25 extending through the spindle. It will therefore be seen that, if the spindles 20 are pushed downwardly, the pins 25 will compress the springs 24. Pushing downwardly on the spindles 20 and compressing the springs 24 results in the yokes 21 leaving the lower arm 19 and moving downwardly toward the plate 7. This carries the upper plate 8 downwardly. The means for pushing down on the spindles 20 is the spring 26 secured to the cover 3 by the bolts 27 or otherwise. The shape of the spring 26 is shown clearly in Figs. 1 and 4. When the cover 3 is lifted enough to remove the pressure of the spring 26 from the spindles 20, the springs 24, pushing upwardly on the pins 25, raise the spindles until the yokes 21 engage the lower arms 19, which serve as stops to limit the upward motion of the plate 8. Conversely, when the cover 3 is lowered and the spring 26 engages the upper end of the spindles 20, these are pushed downwardly, pressing the plate 8 against the food on plate 7 with a pressure which is equal to the difference in the pressures of the two springs 24 and 26. In order that the plate 8 may be pushed downwardly against the meat or other food between the plates, it is necessary that the spring 26 be more than strong enough to overcome the combined force of the two springs 24.

Since the rack and gear for raising the plates 7 and 8 out of the cooking pot 2 form no part of my invention, they are not described herein. They constitute a part of the invention of Herchael Wood Miller, referred to above.

Figure 3:
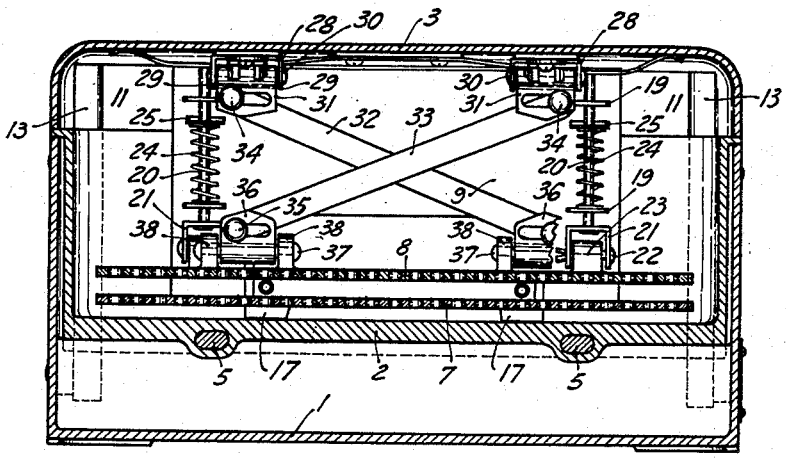
Fig. 3 represents a vertical longitudinal section of the structure shown in Figs. 1 and 2.

U-shaped members 28 having arms 29 are provided with openings for the reception of pivot pins 30 which pivotally connect the leaves 31 to the cover 3. Link members 32 and 33 have pins 34 extending therethrough, such pins being slidable in slots in the leaves 31, as shown clearly in Figs. 3 and 4. These link members are crossed so that they connect opposite sides of the cover and plate 8. One end of link 32 is connected to the left side of the cover while its second end is connected to the right side of the plate 8. Correspondingly, link 33 is connected to the right side of the cover and the left side of the plate. The second ends of these links have pins therein corresponding to the pins 34, and these pins are slidable in slots in the leaves 36 which turn on pivot pins 37 passing through the lugs 38 on the back of plate 8.

From the foregoing, taken in connection with the drawings, it is apparent that, when the cover 3 is lowered, there will, at first, be no downward movement of the spindles 20, the plate 8 turning on its pivot pins 22 into a substantially horizontal position. However, it should be noted that the rack and gear will cause the assembly 6, 7, 8, and connected parts to move downwardly as the cover is lowered, since the gear is connected to the cover and turns therewith about the pivot 4. However, this causes no relative approach of the plates 7 and 8 other than that caused by the turning of the plate 8 about its pivots 22. However, when the plate 8 gets into a substantially horizontal position above the plate 7, the spring 26 will engage the upper ends of the spindles 20 and will force these downwardly, carrying the pivot edge of the plate 8 toward the plate 7 at substantially the same rate as the opposite edge of the plate is lowered. The pin and slot connections of the links 32 and 33 with the leaves 31 and 36 permit a certain amount of freedom of movement between the plate 8 and the cover 3 in order that the plate may adjust itself properly to the food contained in the cooker.

While this cooker has been designed primarily for the cooking of meats, it has been used also for the cooking of French fried potatoes, doughnuts, and other foodstuffs, and no limitations as to the use of the machine should be implied because of any statements contained in this specification.

Having now described my invention, I claim:

1. In a cooker having a supporting casing, a cover pivotally connected thereto, and a cooking pot therein; in combination, a pair of upper and lower pressure plates located in the pot and constructed and arranged for approximately vertical motion, said plates being pivotally connected for relative pivotal motion, guide means connected to said plates and cooperating with other guide means in the casing to guide said plates substantially vertically as they move upwardly and downwardly, and a crossed link toggle guide connecting the cover and the upper plate to cause said plate to have pivotal motion with relation to the lower plate and to maintain the cover and upper plate approximately parallel as they are turned about their respective pivots.

2. In a cooker of the type indicated having a casing, a cover, a contained cooking pot, a pair of upper and lower pressure plates to be lowered into the pot and removed therefrom, the lower pressure plate moving substantially vertically so that it remains substantially horizontal at all times, the upper plate being pivotally mounted to turn from a horizontal position to a vertical position as it is raised, and means connecting the part of the upper plate remote from its pivot to the cover so that pivotal motion of the cover will cause similar movement of the upper plate; the combination of a spring for raising the upper plate away from the lower plate, and means on the inside of the cover for compressing said spring when the cover is lowered whereby to put pressure upon food between the plates when the cover is lowered.

3. In a cooker of the type indicated wherein there is a supported cooking pot provided with a pivotally connected cover and a pair of upper and lower pressure plates; the combination of means connected to the cover and the upper plate to cause pivotal motion of the upper plate when the cover is raised, spring means connected to the upper plate to raise same when it is not forced downwardly, and substantially non-compressible means connected to the upper plate to compress the spring means and force the upper plate down when the cover is lowered.

4. In a cooker of the type indicated wherein there is a supported cooking pot provided with a pivotally connected cover and a pair of upper and lower pressure plates; the combination of spring means on the inside of the cover, rigid means connected to the upper plate to push the same downwardly when the cover is closed, spring means to raise the upper plate away from the lower plate when the cover is raised, and connecting means between the cover and upper plate to raise the upper plate when the cover is raised, the spring means on the cover engaging the rigid means to resiliently force the upper plate down when the cover is lowered.

5. A cooker comprising a casing enclosed cooking pot, a cover pivotally connected to the casing, upper and lower pressure plates movable into and out of the pot, the upper plate being pivotally mounted with respect to the lower plate, and crossed linkage means connecting the cover and the upper plate to transmit pressure from the cover to the upper plate when the cover is lowered to closed position.

6. In a cooker having a casing with a cooker pot located therein and a cover pivotally connected to the casing, upper and lower pressure plates in the pot movable up and down out of and into cooking position, supporting means for said plates movable to raise and lower the plates, a guiding bracket on said supporting means movable therewith, a support connected to the upper plate and movable substantially vertically with respect to said guiding bracket, a spring to raise said support and thereby raise said upper plate, and spring means on the inside of the cover to engage the support when the cover is closed, whereby to resiliently press the upper plate downwardly when food is located between the plates and the cover is lowered.

ERICK G. ERICKSON.